United States Patent

Pölling

[11] Patent Number: 6,135,262
[45] Date of Patent: Oct. 24, 2000

[54] LINK CONVEYOR

[75] Inventor: Ludger Pölling, Wadersloh, Germany

[73] Assignee: Bernhard Beumer Maschinenfabrik KG, Beckum, Germany

[21] Appl. No.: 09/076,723

[22] Filed: May 13, 1998

[51] Int. Cl.[7] .................................................. B65G 47/46
[52] U.S. Cl. ...................................................... 198/370.04
[58] Field of Search ........................... 198/370.04, 370.01

[56] References Cited

U.S. PATENT DOCUMENTS

| | | | |
|---|---|---|---|
| 3,231,066 | 1/1966 | Harrison et al. | 198/370.04 |
| 4,031,998 | 6/1977 | Suzuki et al. | 198/370.04 |
| 5,667,054 | 9/1997 | Van den Goor | 198/370.04 |
| 5,857,555 | 1/1999 | Maier et al. | 198/370.04 |

*Primary Examiner*—James R. Bidwell
*Attorney, Agent, or Firm*—Kenyon & Kenyon

[57] ABSTRACT

A link conveyor, in particular for sorting parcel items having a plurality of carrying plates arranged in succession and in close proximity to one another in the direction of conveyance, the plates being supported by supporting devices on a continuous supporting chain being drivable along the conveyor line, where (a) the supporting devices each have a bottom support section being connected to and projecting upward from the supporting chain and being connected over a tilt axle running in the conveyance direction to a top support section projecting downward from the carrying plate and attached to it; (b) each carrying plate being tiltable laterally by a tilting mechanism about the tilt axle from an essentially horizontal conveyance position into an inclined delivery position; (c) an end wall extending down at a right angle from the carrying surface is arranged on the front and/or rear edges running across the conveyance direction of each carrying plate; and (d) the carrying plates each have two partially overlapping carrying plate sections with one carrying plate section guided by a guide on the facing side of the other carrying plate section so that it can move relative to the other carrying plate section in traveling through curved sections of the conveyor line, and the other carrying plate section of a carrying plate has a flexurally stiff plate extending over the entire length of the carrying plate, and being supported on a link of the supporting chain at a distance from the overlap area.

23 Claims, 16 Drawing Sheets

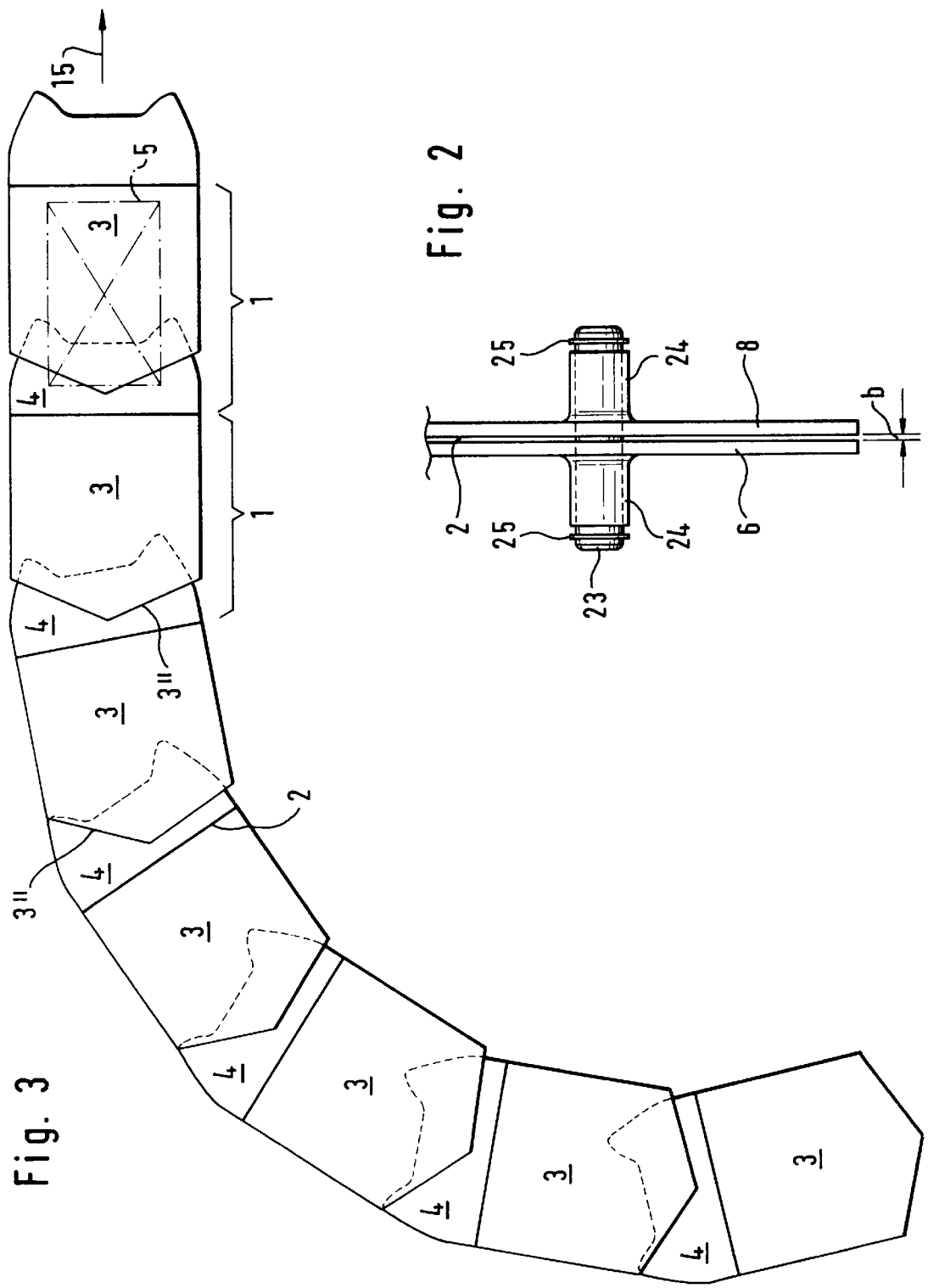

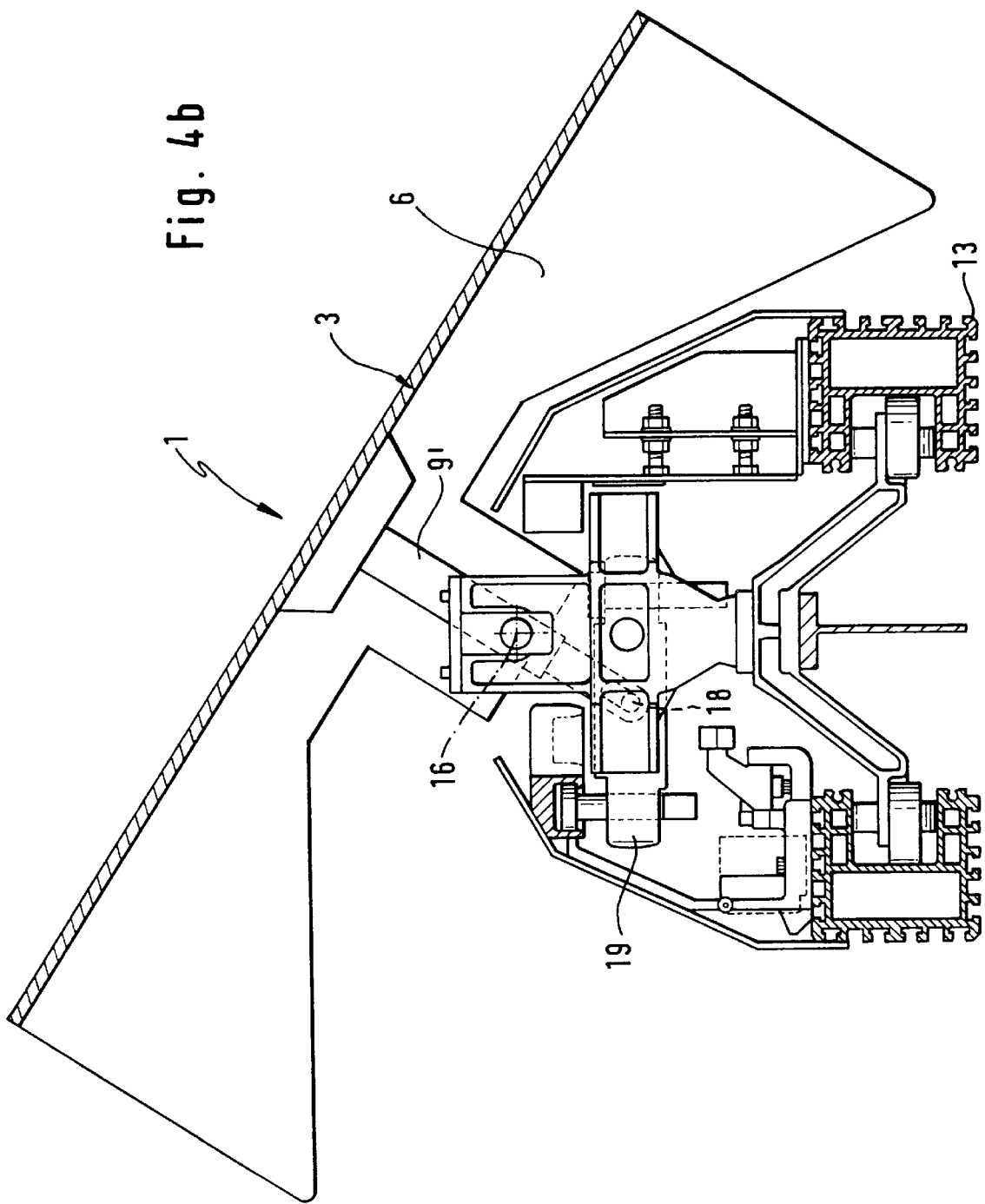

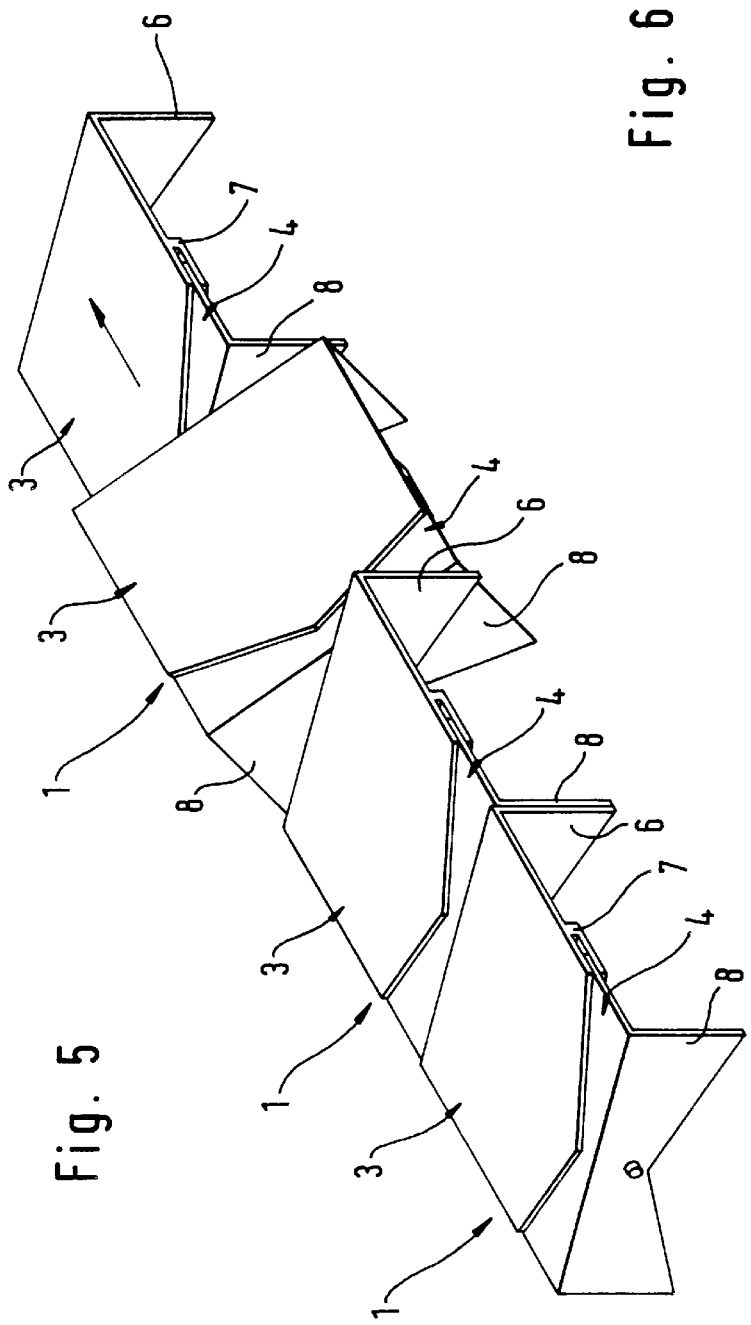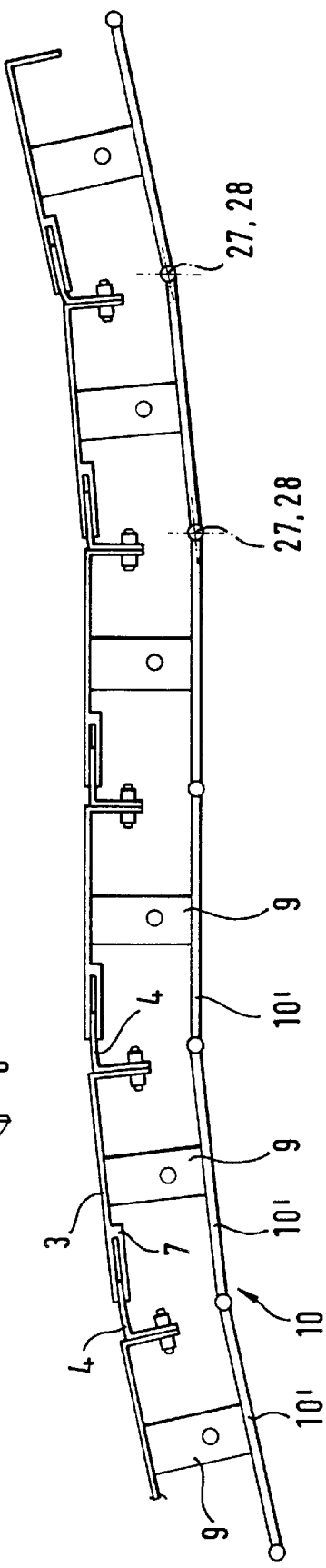

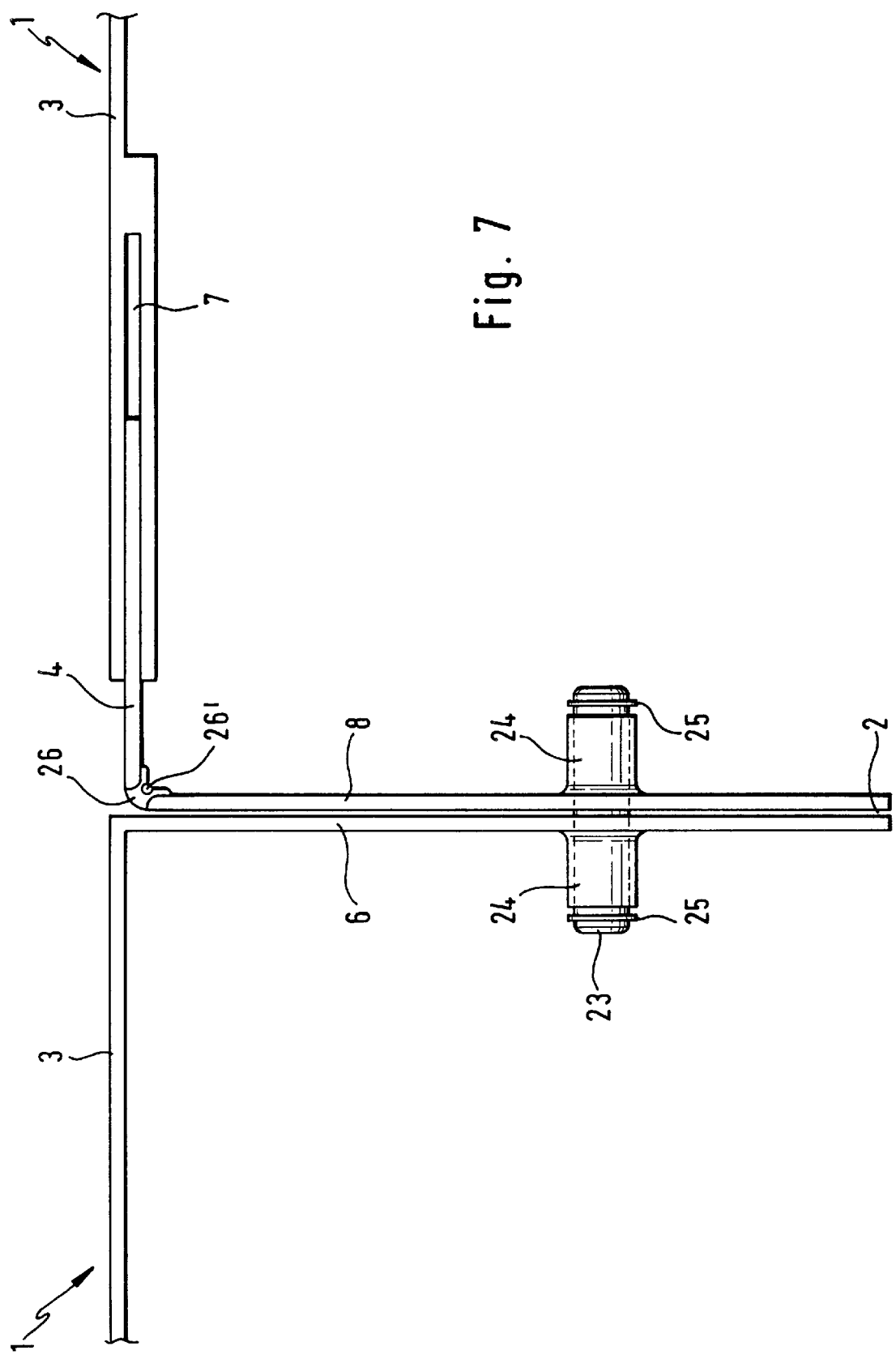

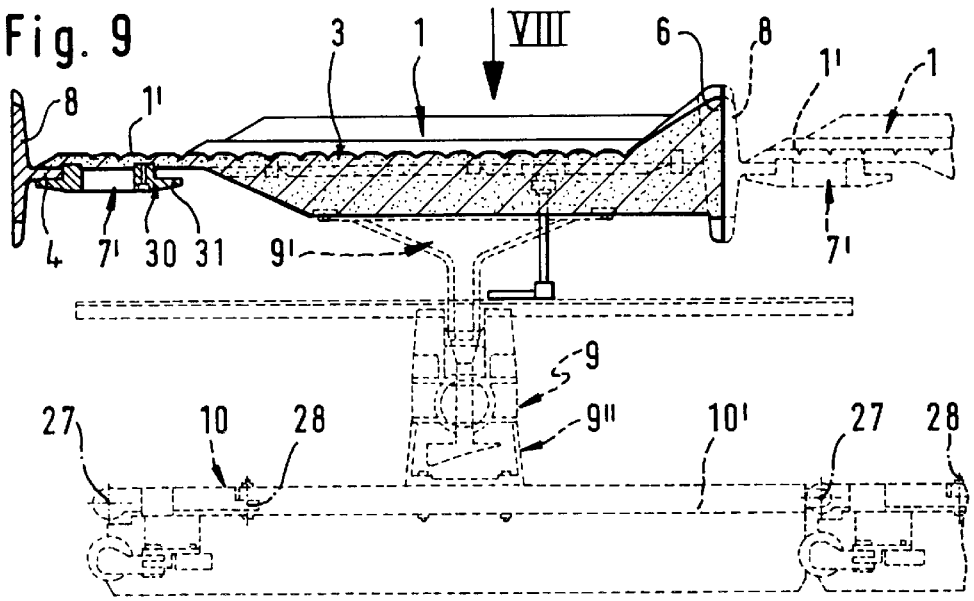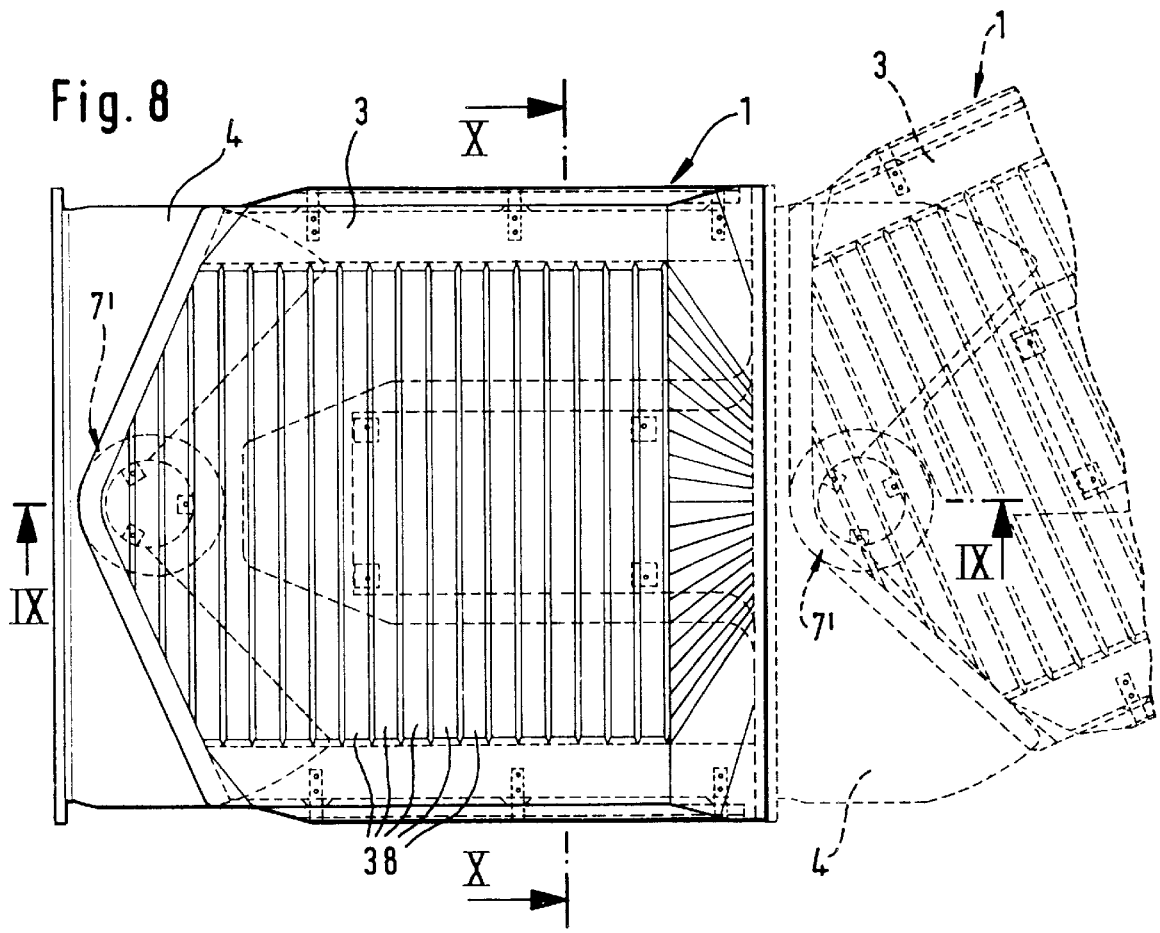

LINK CONVEYOR

The present invention concerns a link conveyor for parcels, specifically for conveying and sorting parcel items, having a drivable conveyor section running along a self-contained conveyor line and having a plurality of carrying plates arranged in close proximity in succession in the direction of conveyance, with the plates being supported by supporting devices on a continuous supporting chain which can be driven along the conveyor line, and the links being pivotable about vertical and optionally also horizontal swivel axes relative to one another, wherein the supporting devices each have a bottom support section connected fixedly to them and projecting upward from the supporting chain, connected with a joint over a tilt axle running in the conveyance direction to a top support section projecting downward from the carrying plate and fixedly attached to it. Each carrying plate has a tilting mechanism connected to a top support section; the carrying plate can be tilted laterally by this tilting mechanism about the tilt axle from an essentially horizontal conveyance position into an inclined delivery position. There is an end wall pointing down at a right angle from the carrying surface arranged on the front and/or rear edge running across the conveyance direction of each carrying plate, and the carrying plates each have two partially overlapping carrying plate section, with one carrying plate section guided by a guide on the facing side of the other carrying plate section in such a way that it can move relative to the other carrying plate section in traveling through curved sections of the conveyor line, i.e., a sorting conveyor which is suitable and intended in particular for sorting parcel items that are placed individually on a carrying plate at a feed point and are delivered by lateral tilting of the carrying plate at a predetermined delivery point, which is one of multiple available delivery points.

Such conveyors, which are also known as sorters, are known in a wide variety of designs, with a considerable distance (also referred to below as a separating gap) generally being provided between adjacent carrying plates, so that they do not collide in going through sections of the conveyor line with a horizontal curvature (also referred to below as horizontal curves). Regardless of their width, as they travel through horizontal curves, the separating gaps narrow on the inside of the conveyor section formed by the carrying plates and widen on its outside, so that parcel items that project beyond the front or rear edge of a carrying plate and extend a distance into a separating gap may become pinched there (and damaged). This may be the case with baggage items such as backpacks or the like, when the carrying straps slip into a carrying joint[1], but it is not uncommon in various other cases, especially when a parcel shifts relative to the carrying plate in conveying items that lack rigidity and dimensional stability.

[1] T.N.: Should be "Trennfuge" ("separating gap") instead of "Tragfuge".

It is therefore desirable to have an essentially closed carrying area which is maintained as such even in traveling through horizontal curves, without forming separating gaps between adjacent carrying plates. With known conveyors like the generic type, this has long been achieved by designing the carrying plates to overlap with one another to the extent that the carrying area remains closed even in horizontal curves. However, these known link conveyors are not suitable for use as tilt sorters, because each of their carrying plates overlaps with an adjacent carrying plate and is overlapped by an adjacent carrying plate at its other end, so that they cannot be tilted laterally either individually or in groups.

This overlap principle has already been used in a tilt sorter whose carrying plates are formed by four mutually overlapping carrying plate sections, each of which is supported on a supporting chain by a separate supporting device (see unexamined French Patent No. 2,304,413). However, there is nevertheless a separating gap between adjacent carrying plates here, its width changing in going through horizontal curves, so that parcels may still become pinched in the separating gap.

Another disadvantage of known sorters is that a parcel item placed on a carrying plate may slip beneath an adjacent carrying plate when the latter is tilted into its inclined delivery position, and then it cannot tilt back into its conveyance position.

This problem is overcome with the generic conveyor known from European Patent No. 0 753,474 A1 by providing an end wall pointing down at a right angle from the carrying area on the front and rear edges of each carrying plate (running perpendicular to the direction of conveyance); when a carrying plate is tilted, this end wall forms a type of guard with respect to the adjacent carrying plate, so that no parcel can slip under the tilted carrying plate from an adjacent carrying plate.

This known conveyor essentially solves the problem discussed above in that the carrying plates are each formed by two carrying plate sections overlapping one another in the middle area of the carrying plate to the extent that they still always overlap even when going around horizontal curves. The one carrying plate section extends from the forward edge of the carrying plate to the rear, and the other carrying plate section extends from the rear edge of the carrying plate to the front, with each carrying plate section supported on its transverse edge facing away from the overlap area with a supporting device on the supporting chain so that adjacent carrying plate sections of adjacent carrying plates are not pivoted relative to one another in going through horizontal curves because their supporting devices are supported on one link of the supporting chain (rather than on adjacent links). Although there is a separating gap between adjacent carrying plates, the width of the separating gap may be as small as desired, so that the carrying area is practically closed when the carrying plates are arranged close together, as is provided there.

With this known conveyor, the (upper supporting sections of the) supporting devices are each to be arranged directly on the front and rear edges of each carrying plate, so they are also arranged directly adjacent to one another on both sides of a separating gap, with the upper supporting sections of two carrying plate sections belonging to different carrying plates being coupled to a common tilt axle held by a lower supporting section. The tilting device which is provided for an upper supporting section of a carrying plate and which causes the carrying plate to be tilted laterally at a predetermined delivery point therefore cannot be integrated into the respective supporting device for reasons of space, but instead it must be arranged on an upper supporting section with an offset (in the direction of conveyance), especially since the end walls are also each arranged on the front and rear edges of each carrying plate, i.e., so they lie in the vertical plane in which the respective upper supporting section is also arranged.

The design of the two carrying plate sections of each carrying plate as a cantilevered projection from an upper supporting section of a supporting device toward the overlap area also leads in particular to both the carrying plate sections and the supporting devices being subjected to extremely high bending moments when a carrying plate is acted upon by a relatively heavy item which is generally placed in the center of a carrying plate so that a corresponding expense must be incurred to achieve the required strength. This expense is further increased by the fact that the carrying plate sections should be designed to be flexible, i.e, elastic, at least in the overlap area, so that they can undergo deformation without blocking and/or damage in going through conveyor line sections with a vertical curvature between a horizontal section of conveyor line and a section running at an angle to the horizontal. Therefore, to meet the two requirements stipulated above, the carrying plate sections are designed to be flexible throughout and are attached at the bottom to a flexurally stiff cantilevered arm outside the overlap area, with this cantilevered arm being in turn attached to the corresponding upper supporting section.

As explained above, the overlap area with the conveyor known from European Patent No. 0 753,474 A1 is essentially in the center between the front and rear edges of each carrying plate and it extends over only a fraction of its length, so that a longer item is supported by both carrying plate sections. Since the two carrying plate sections are pivoted relative to one another in going through a horizontal curve, it may happen that the parcel is then in a different position relative to the carrying plate and may even project beyond it at the side, so that there could be a collision with fixed parts or people next to the conveyor line. Furthermore, a change in position of parcel items during conveyance often has a negative effect on the dispensing operation.

The object of the present invention is to create a generic conveyor which is improved and greatly simplified in comparison with the related art and has an essentially closed carrying area at all times, and which achieves this without the above disadvantages and may also be designed with almost any known supporting devices, including those which guarantee an especially gentle delivery of parcels owing to the movement of the carrying plate when tilted (due to the fact that the carrying plate is also lowered in the tilting operation at the same time).

This object is solved by the present invention in that the other carrying plate section of a carrying plate basically has an essentially flexurally stiff plate or the like extending essentially over the entire length of the carrying plate and supported on a link of the supporting chain at a distance from the overlap area with a supporting device; and of the carrying plate, the one carrying plate section which is not connected directly to the supporting chain is coupled to another adjacent carrying plate section of the carrying plate by a sliding element so that the two carrying plate sections can move relative to one another in a horizontally and/or vertically curved conveyor line section while maintaining an essentially self-contained, gap-free conveyor plane on uncurved sections of conveyor line.

The feature whereby the top carrying plate section of each carrying plate is composed of a flexurally stiff plate or the like extending essentially over the entire length of the carrying plate ensures first that a parcel placed on a carrying plate is supported practically only by the top carrying plate section—even in the area of horizontal curves of the conveyor line—so that it always retains its position relative to the carrying plate. However, this especially achieves the result that the bottom carrying plate section is under practically no load from the weight of a parcel placed on a carrying plate, so that it need not be supported by a supporting device on the supporting chain, and therefore one supporting device per carrying plate is sufficient. In another feature according to the present invention, this is not arranged on the free transverse edge of the top carrying plate section, but instead is a distance from the overlap area, preferably approximately at the center relative to the carrying plate, on the top carrying plate section, so that not only is it possible to use conventional supporting devices with an integrated tilting mechanism (including those where the carrying plate is lowered in tilting), but also there is a more favorable transmission of the weight exerted by the parcel on the supporting chain, especially when the top carrying plate section is supported essentially in the middle.

Since the bottom carrying plate section of a carrying plate is under practically no load from the parcel resting on it, and therefore it need not be supported on the supporting chain with a supporting device, but on the other hand it should be tilted together with the carrying plate when the latter is tilted, and it must be prevented from slipping out of the guide for the top carrying plate section, it is coupled at one end wall to the directly adjacent end wall of the top carrying plate section of the adjacent carrying plate with a swivel pin aligned with the tilt axle in one embodiment. Since the swivel pin is under hardly any load, it may be designed to be relatively small, but it has nevertheless proven expedient not only to design it as a through-bolt which is guided through appropriate holes in the end walls (and secured to prevent it from slipping out axially) but also to mount it in bushings shaped into the end walls.

If the swivel pin is guided in a vertical slot in an adjacent end wall, it is also possible in such an embodiment with supporting plate end walls to use supporting devices known from European Patent No. 0 664,262, where the carrying plate is lowered in tilting in an expedient manner, so that parcels can be delivered in a very gentle, controlled manner.

To make it possible to move through vertical curves without problems, the bottom carrying plate section may be designed to be flexible in a known way. However, such a design may lead to fatigue fractures over a period of time, so a first embodiment for vertical curve-going conveyors also provides for designing the bottom carrying plate section of each carrying plate as a rigid plate and connecting it to its end wall by a joint on its transverse edge facing away from the overlap section, so that it can be pivoted up or down relative to its end wall in the area of a vertical curve.

Other designs of curve-going conveyors according to the present invention have a sliding and articulated element supported on the supporting chain or arranged on the supporting device for each carrying plate plus optionally a sliding unit designed as a sliding block or the like which can be connected to the adjacent supporting device by a (sliding) support element.

It should also be pointed out that the carrying plates need not necessarily be designed as flat plates, and instead may also be designed with a cup shape or pan shape. This is true in particular of its top carrying plate section.

It should also be pointed out in particular that the carrying plates may be made preferably of a rigid hollow body (preferably a fiberglass reinforced plastic, FRP) whose hollow cavity may be filled preferably with polystyrene foam or the like, so that even very large carrying plates are very lightweight but very resistant.

Ribbing of the carrying area or a similar treatment has proven to be very expedient, so that precipitation, condensation or the like on the carrying areas does not result in adhesive forces acting on the parcels, which would interfere with operation.

Preferred embodiments of the present invention are described in the subclaims.

BRIEF DESCRIPTION OF THE DRAWINGS

The present invention is explained in greater detail below with reference to simplified drawings, which show:

FIG. 2: an enlarged view of the detail outlined with a dash-dot circle II in FIG. 1a;

FIG. 3: a greatly simplified partial top view of the sorter according to FIG. 1 in the area of a horizontal curve;

FIG. 5: a highly diagrammatic, perspective view of several carrying plates with their end walls;

FIG. 6: a highly diagrammatic partial view according to FIG. 1, showing a section of the conveyor traveling through vertical curves;

FIG. 7: an enlarged view of the area bordered by a dash-dot line VII in FIG. 1a, with the bottom carrying plate section coupled to its end wall with a joint;

FIG. 8: a top view of another preferred embodiment of a conveyor according to the present invention with horizontally curved conveyor sections, specifically a top view in the direction of arrow VIII in FIG. 9, showing a carrier plate with solid lines and a partial top view of the carrying plate adjacent to it on the right (shown with dotted lines), pivoted in the horizontal relative to the other carrying plate in FIG. 8;

FIG. 9: a sectional view through the carrying plates according to FIG. 8, as seen in the direction of sectional line IX—IX in FIG. 8;

DETAILED DESCRIPTION

Figure 1:
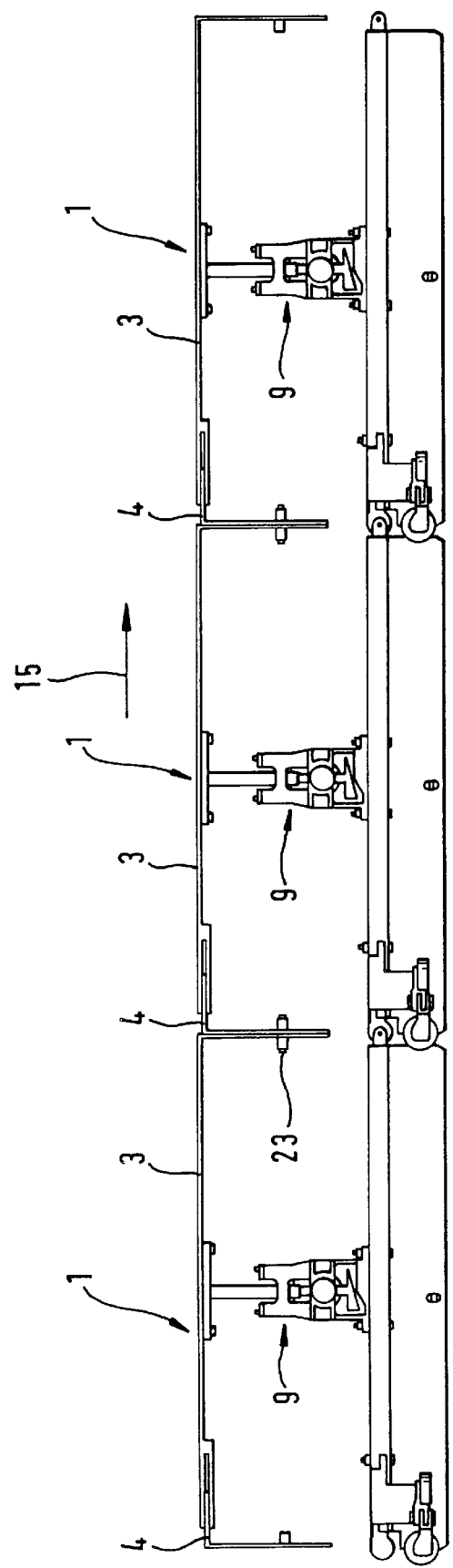
FIG. 1: a side top view of a longitudinal section of a tilt sorter according to the present invention, omitting various parts (e.g., the support and guidance of the supporting chain)
Figure 1A:
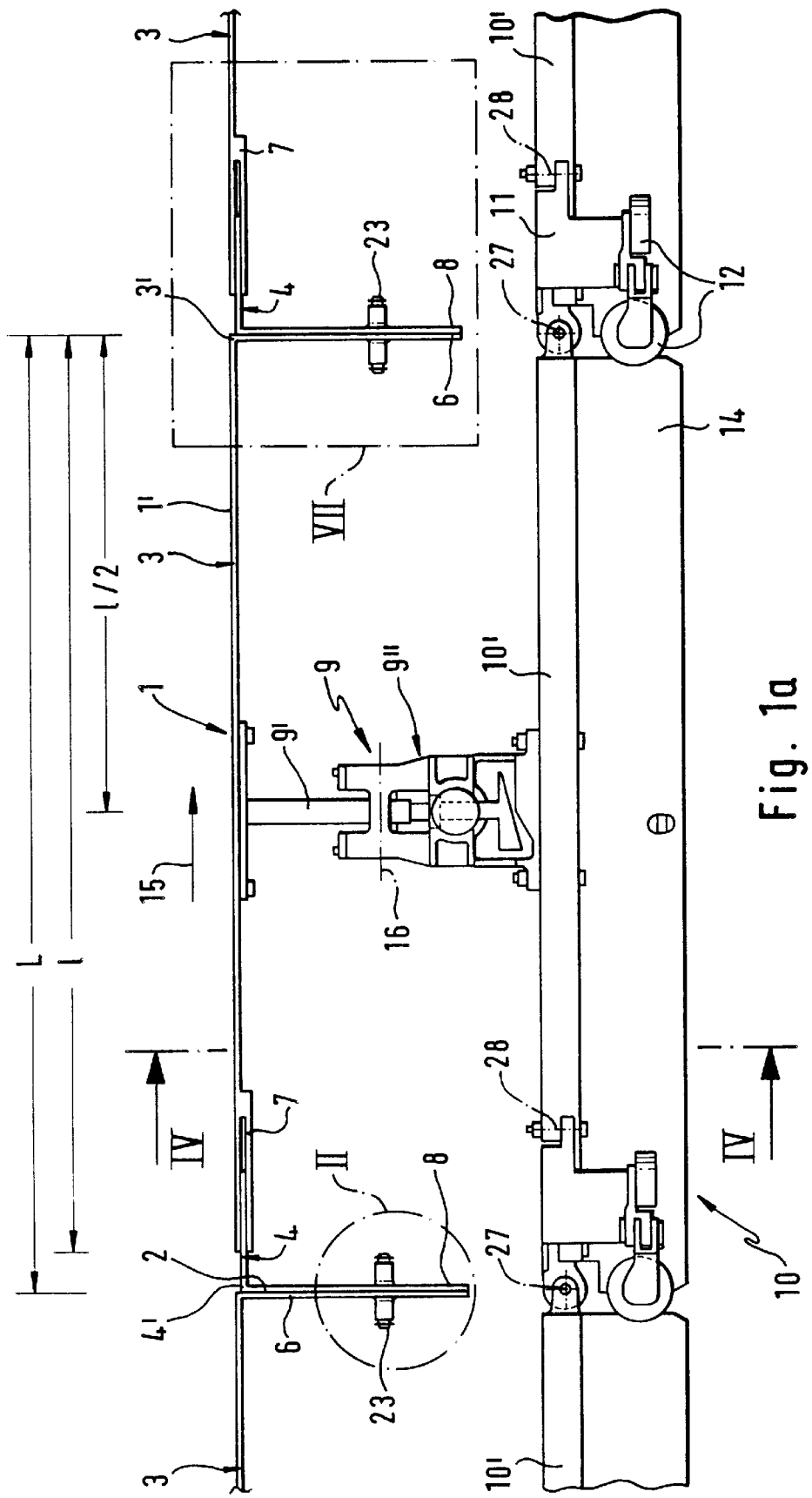
FIG. 1a: an enlarged detail from FIG. 1.

FIGS. 1 and 1a show a simplified side view of a section of a link conveyor for sorting parcels that runs along a self-contained conveyor line having horizontal sections (see FIGS. 1 and 1a, for example) and sections running at an inclined angle to the horizontal (see FIG. 6, for example). The conveyor line is continuous, so the conveyor has sections with a horizontal curvature (horizontal curves) (see FIG. 3, for example).

The conveyor section has a plurality of rectangular (as seen from above) carrying plates 1, arranged in close succession, forming a very narrow separating gap 2 with width b of only 2 mm. To make it possible to run through horizontal curves nevertheless, carrying plates 1 each have two parallel, partially overlapping carrying plate sections 3, 4. Top carrying plate section 3 of each carrying plate 1 has a flexurally stiff plate (i.e., a plate-shaped element which undergoes practically no deformation when acted upon by a parcel normal to the carrying area). Its length l is only slightly smaller than total length L of a carrying plate 1, so that a parcel 5 placed on a carrying plate 1 at a loading point (not shown) is supported practically by top carrying plate section 3 alone.

Top carrying plate section 3 of each carrying plate 1 is provided with end wall 6 pointing down at a right angle from carrying area 1' at its front edge 3', and on the bottom side of its rear end section it has a slotted guide 7 in which bottom carrying plate section 4 of carrying plate 1 is guided so that it can pivot relative to top carrying plate section 3 in going through horizontal curves (see FIG. 3). Bottom carrying plate section 4 has an end wall 8 pointing down at a right angle from carrying area 1' on its rear edge 4'.

Figure 4A:
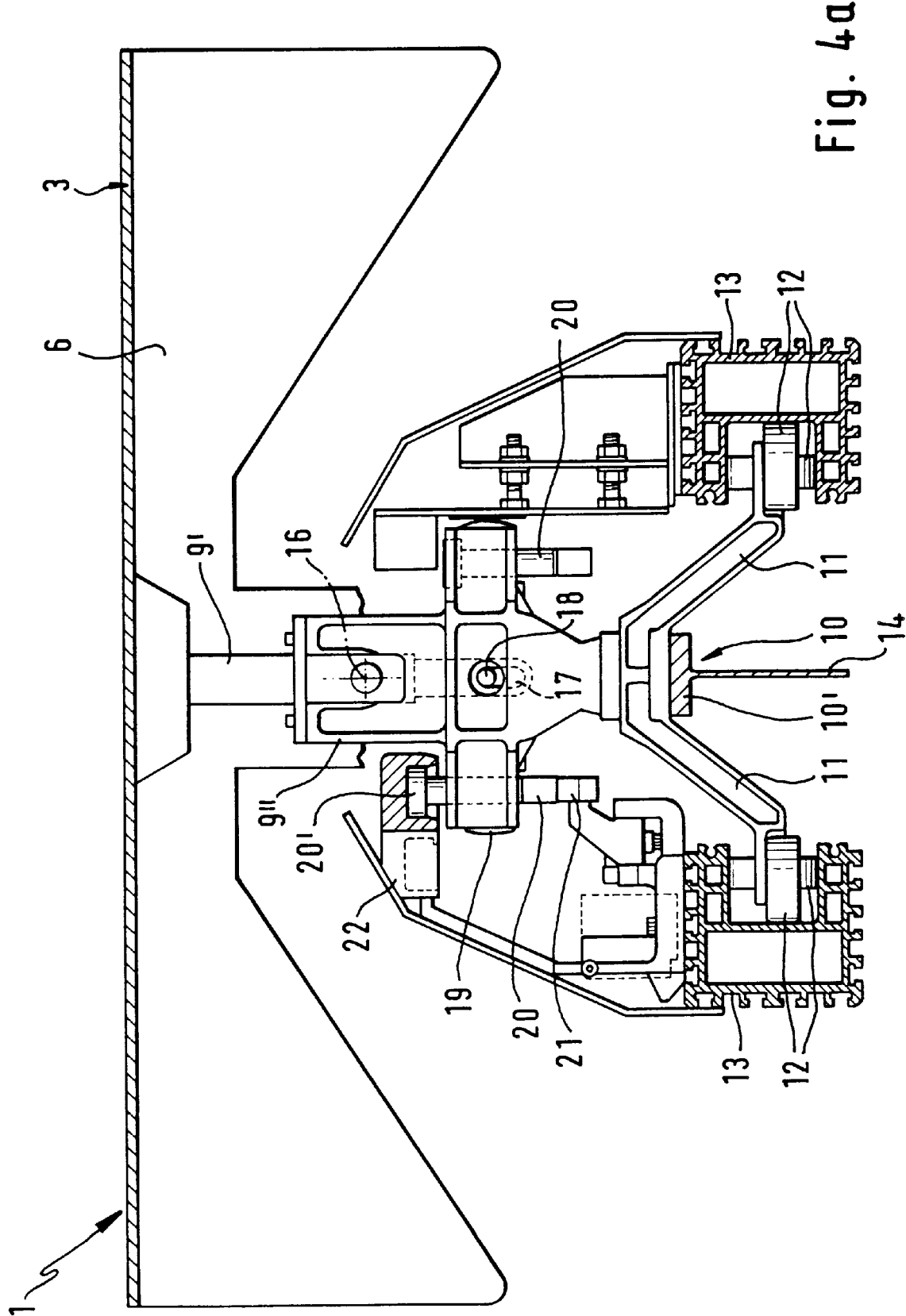
FIGS. 4a, b: a greatly enlarged, partially completed sectional view as seen in the direction of sectional line IV—IV in FIG. 1a, with FIG. 4a showing the horizontal conveyance position, and FIG. 4b showing the inclined, tilted position of a carrying plate.

Top carrying plate section 3 of each carrying plate 1 is supported at a distance l/2 from its end wall 6 by a supporting device 9 on a link 10' of a supporting chain 10, which is itself supported on stationary guide rails 13 over arms 11 (not shown in FIG. 1) and rollers 12 (see FIGS. 4a, b) and can be driven by a linear motor (FIGS. 4a, b show only brace 14).

Supporting devices 9 each have a top support section 9' extending at a right angle down from the bottom side of a top carrying plate section 3 plus a bottom support section 9"

extending at a right angle down from respective link 10' of supporting chain 10 and connected to one another in an articulated manner by a tilt axle 16 which points in conveyance direction 15 and is supported on bottom support section 9".

Top support section 9' attached to the center of the bottom side of each top carrying plate section 3 is essentially linear and extends down beyond tilt axle 16, where it has a slot 17 in which is engaged a pin 18 that runs parallel to tilt axle 16 and extends through a crossbar 19 displaceably mounted and guided on bottom support section 9" across conveyance direction 15. In the normal conveyor status (FIGS. 1, 1a, 4a) crossbar 19 is locked by head bolts 20 on bottom support section 9", where head bolts 20 are sunk, as shown in the right part of FIG. 4a.

For unlocking a carrying plate 1 and then tilting it laterally, a cam 21 in a stationary mount at the respective delivery point is pivoted up out of a previously lowered position, so that the lower end of a head bolt 20 runs up onto cam 21, raising it and at the same time unlocking crossbar 19. Head 20' of this head bolt 20 enters a guide 22 that is curved outward in conveyance direction 15 in a stationary mount at the delivery point (see left portion of FIG. 4a) and is guided laterally outward from there, with head bolt 20 moving crossbar 19 out of its central position (FIG. 4a) toward the side (FIG. 4b), which in turn tilts top support section 9' and thus carrying plate 1 about tilt axle 16 into the inclined position according to FIG. 4b by using pin 18. Carrying plate 1 is automatically tilted back into the horizontal conveyor position according to FIG. 4a due to an appropriate design of guide 22, so that head bolt 20 finally drops back into its locked position.

For additional details of this known locking and tilting mechanism, see European Patent No. 0 664,262 A1.

FIG. 5 shows how end walls 6, 8 work. When a carrying plate 1 tilts/is tilted, it closes[2] the space below carrying plate 1 flush with adjacent carrying plates 1 that have not been tilted, so that no parcel can slip under tilted carrying plate 1 from there. They also form a bearing for a swivel pin 23 aligned with tilt axle 16 for bottom carrying plate sections 4 of a carrying plate 1 not supported on supporting chain 10 with a supporting device 9 (see in particular FIG. 2). Therefore, a bushing 24 has been shaped into each end wall 6, 8 and is aligned with bushing 24 of the adjacent end wall so a swivel pin 23 can be inserted there and secured at its ends projecting beyond bushings 24 using locking rings 25 to prevent it from slipping out.

[2] T.N.: Should be "schließt."

Bottom carrying plate section 4 of each carrying plate 1 is designed as a flat plate and forms a leg of an L-shaped element whose other leg forms an end wall 8. Since bottom carrying plate section 4 is under practically no load from the weight of a parcel placed on respective carrying plate 1, it can be relatively thin and may optionally be so flexible that it can undergo elastic deformation in going through vertical curves, as diagramed in FIG. 6. The tilting moment impressed on top carrying plate section 3 in tilting a carrying plate 1 must be transmitted by that section to bottom carrying plate section 4 in the area of guide 7, so it is more expedient to design bottom carrying plate section 4 as a rigid plate. This is also possible when bottom carrying plate section 4 is connected to its end wall 8 by a joint 26 whose swivel axis 26' runs parallel and adjacent to the rear edge of carrying plate 1, as shown in FIG. 7.

Top carrying plate section 3 runs essentially over entire length L of each carrying plate 1 and is close to top carrying plate section 3 of next carrying plate 1, so it is canted at its rear edge 3" from the middle to the longitudinal edges so hat it cannot collide with adjacent top carrying plate sections 3 when going through horizontal curves, as shown in FIG. 3.

It should also be pointed out that links 10' of supporting chain 10 are connected to one another over horizontal swivel axes 27 and vertical swivel axes 28, thus making it possible to go through horizontal and vertical curves, with swivel axes 27, 28 arranged next to one another; details of the design are not shown here, because they are irrelevant for the present invention (and they are already known), and it is based on the design of carrying plates 1 or their carrying plate sections 3, 4 and their support on supporting chain 10. It is readily apparent that the conveyor according to the present invention, as explained above on the basis of an embodiment, is greatly simplified in comparison with the related art because only one supporting device 9 is needed per carrying plate 1, as is the case with conventional sorters, and due to the arrangement of the supporting device— preferably centrally—at a distance from end walls 6, 8, not only is it possible to use conventional supporting devices 9 with an integrated tilting mechanism, but also the design of carrying plate sections 3, 4 is very simple. This is true of top carrying plate section 3, which is supported by supporting device 9, and also in particular for bottom carrying plate section 4, which is under practically no load and need not be supported on supporting chain 10, because the weight of a parcel 5 placed on the flexurally stiff top carrying plate section 3 is supported by it and transmitted to supporting chain 10 in a statically advantageous manner. Despite all these great simplifications, there can be no wedging of parcels on the carrying area or between a tilted carrying plate 1 and an adjacent carrying plate 1 which has not been tilted.

Figure 7A:
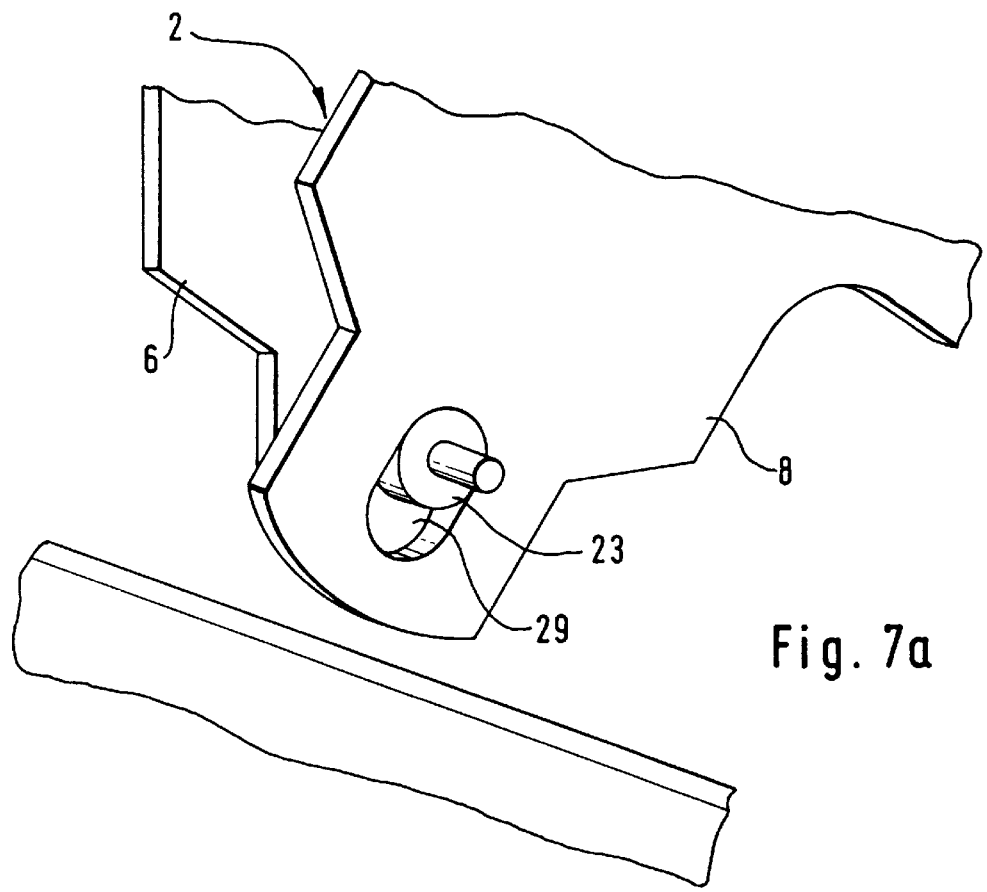
FIG. 7a: a perspective view corresponding to the lower portion of FIG. 7, showing two adjacent end walls, one of which is provided with a fixedly arranged swivel pin guided in a slot in the other end wall.
Figure 7B:
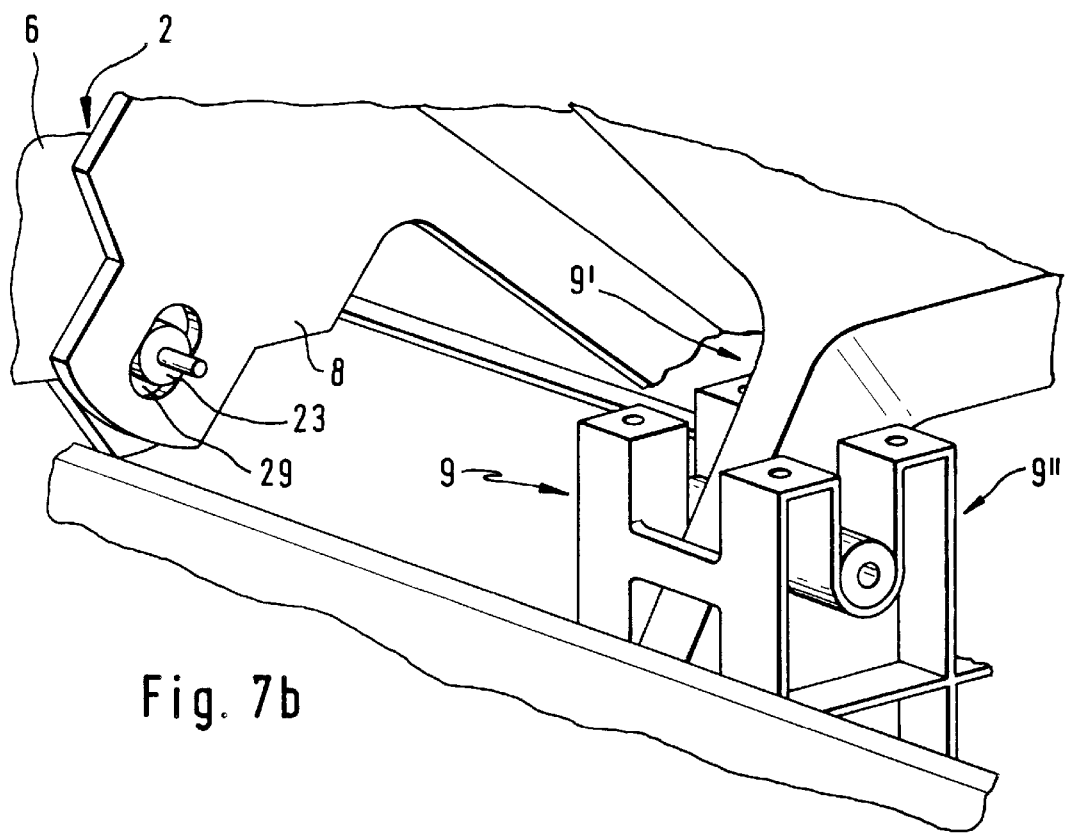
FIG. 7b: a slightly reduced (and more extensive) partial view corresponding to FIG. 7a, where the swivel pin assumes a different relative position in the slot in the other end wall, and part of the adjacent supporting device can be seen in an almost tilted state.

FIG. 7a shows a partial perspective view of a variant of the design according to FIG. 7, which differs front the latter in particular as follows: swivel pin 23 mounted on end wall 6 is guided in a slot in end wall 8, in particular to permit the use of supporting devices 9 (see detail in FIG. 7b) according to European Patent No. 0 664,262 A1 or the like, where carrying plate 1 is lowered in tilting to deliver the parcels in a particularly gentle manner, as explained in detail in the aforementioned publication.

FIGS. 8 through 11 show a highly preferred variant on the example of a carrying plate 1 (shown with solid lines), and a partial view of a carrying plate 1 (shown with dotted lines) connected to it and swivelled in the horizontal (in the diagram according to FIG. 8) relative to its adjacent carrying plate 1, with this variant differing in numerous ways from the embodiments presented and described so far.

Although carrying plates 1 also have end walls 6 and 8 on their front and rear edges, these end walls not only extend down from a carrying plate 1 but also upward, and they are not connected to one another like a hinge by swivel pins 23 guided through end walls 6, 8. Instead, in this design, each carrying plate 1 has a sliding and articulated element 7' which is arranged at the center of the end section of top carrying plate section 3 facing bottom carrying plate section 4, and its swivel pin 30 which is essentially perpendicular to a conveyor section that is not curved about a horizontal axis passes through bottom carrying plate section 4, with a flange 31 provided on the free bottom end of swivel pin 30, and distance a between the bottom side of top carrying plate section 3 and the top side of flange 31 is approximately equal to thickness s of bottom carrying plate section 4 in the overlap area, so that bottom carrying plate section 4 is sandwiched and guided and held between the preceding elements, but it can rotate about swivel pin 30, as shown especially clearly in FIG. 8.

Figure 10:
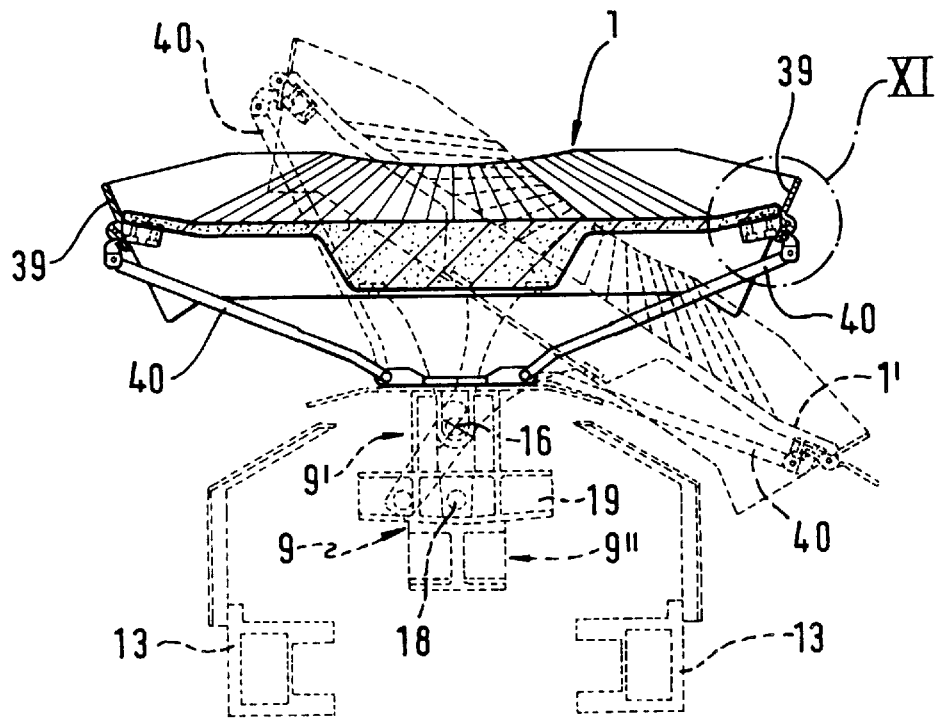
FIG. 10: a section through the carrying plate according to FIGS. 8 and 9 as seen in the direction of sectional line X—X in FIG. 8.
Figure 11:
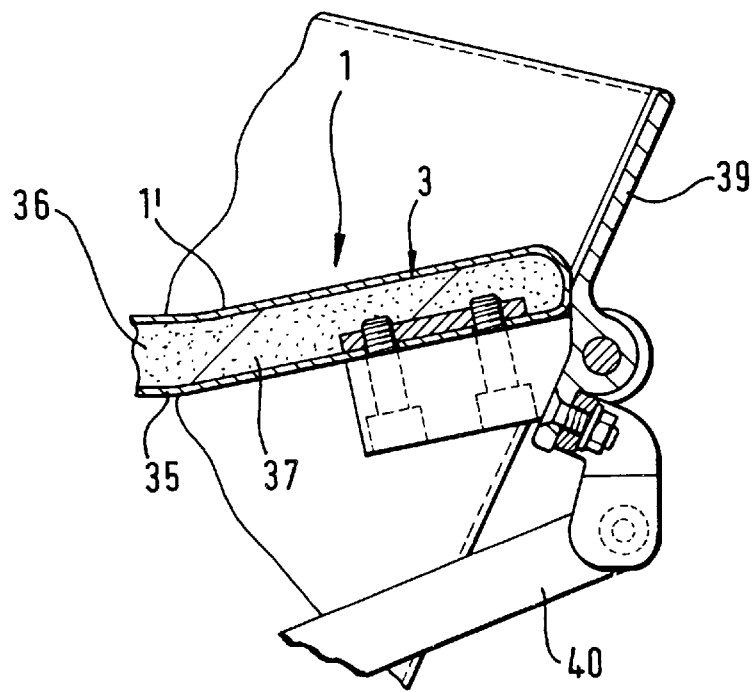
FIG. 11: an enlarged view of detail XI outlined with a dash-dot circle in FIG. 10.

In addition, it should be pointed out that upright side rims 39 are provided on the longitudinal edges of carrying plate 1 and stand up at an inclination in the normal conveyance condition as shown in FIGS. 10 and 11 and are automatically swivelled outward by guide rods 40 on the tilt side when the plate is tilted (see dotted line in FIG. 10) to the extent that they are essentially flush with their adjacent edge section of carrying area 1' when tilted. The obvious purpose of this measure and its embodiment are presented and described in detail in Unexamined German Patent No. 19,721,850, so they need not be discussed further here.

In addition, the design according to FIGS. 8 through 11 differs not only from the embodiments described above but also in general from carrying plate and carrying dish designs of sorters in the related art in that carrying plates 1 each have essentially a casing-like hollow body 35 made in particular/ preferably of a resistant plastic material such as fiberglass reinforced plastic (GRP), with hollow cavity 36 of hollow body 35 being filled with polystyrene foam, so that carrying plates 1 are extremely lightweight but nevertheless have a high resistance moment even when they have large dimensions (in particular a relatively great width), and therefore they can carry even relatively heavy parcels with no problem. As shown in FIGS. 8 through 11, the center sections of carrying plates 1 are much thicker than the edge sections, although these sections are also filled with polystyrene foam.

It should also be pointed out that the surface of carrying plates 1, i.e., carrying plate 1', has numerous ribs 38 which prevent strong adhesion forces from acting between the parcel and (smooth) carrying area 1' in the presence of moisture, which can occur due to precipitation, wet parcels or possibly even condensation; in the related art, this has frequently had a very negative effect on smooth operation of sorters.

Figure 12:
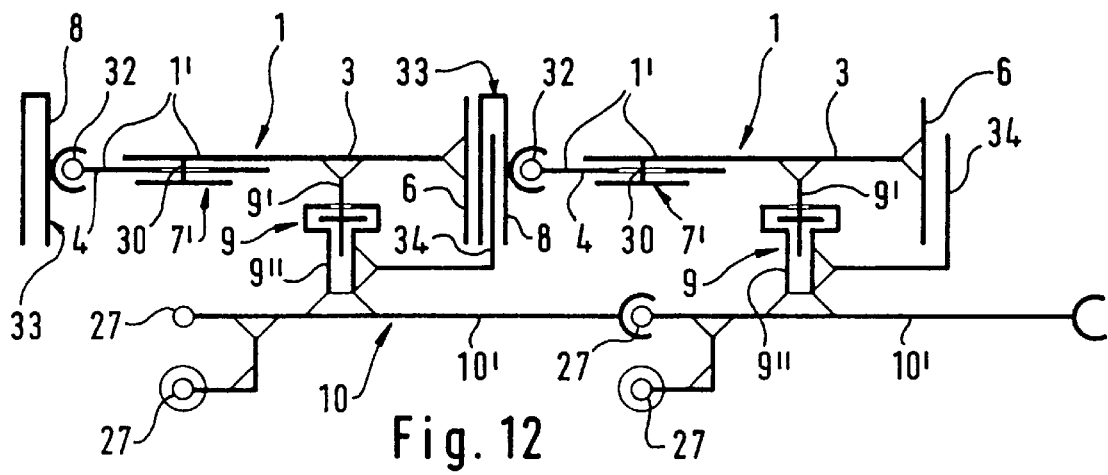
FIG. 12: a highly diagrammatic partial view of a variant, namely a partial top view from the side [?] of two adjacent conveyor elements which are on an uncurved section of the conveyor line.

FIGS. 12 ff. show an especially preferred variant in a highly schematic diagram, and here again, the same reference numbers have been used for the same or similar parts as in the embodiments described above. These embodiments are intended in particular for a conveyor line which has a vertical curvature about a horizontal axis in at least one section. At its end facing away from sliding and articulated element 7', bottom carrying plate section 4 of a carrying plate 1 is coupled by a ball joint or a hinge 32 with a horizontal swivel axis to a slide unit 33 which is designed as a sliding block or the like and is connected to adjacent supporting device 9 by a support element 34 which holds it so that it can slide.

Figure 13:
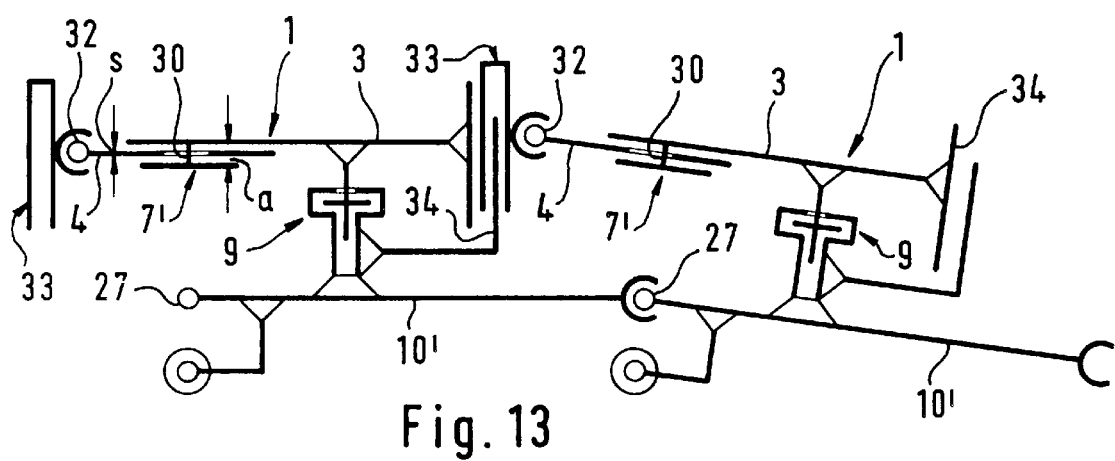
FIG. 13: the conveyor strand section according to FIG. 12 in the area of a convex vertical curve.
Figure 14:
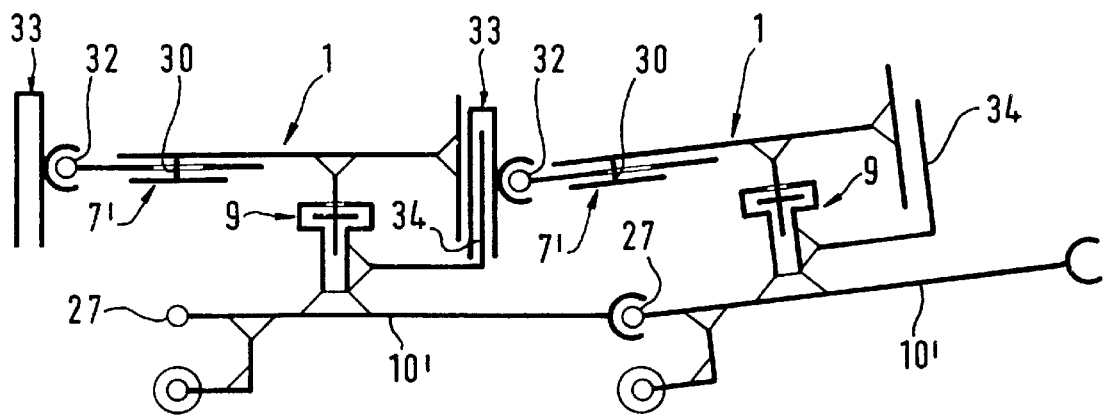
FIG. 14: the conveyor strand section according to FIG. 12 in the area of a concave vertical curve.

FIG. 12 shows such a design in the area of a straight, uncurved section of line, while FIG. 13 shows two adjacent conveyor elements in the area of a convex curve, and FIG. 14 shows the same in the area of a concave curve.

Figure 15:
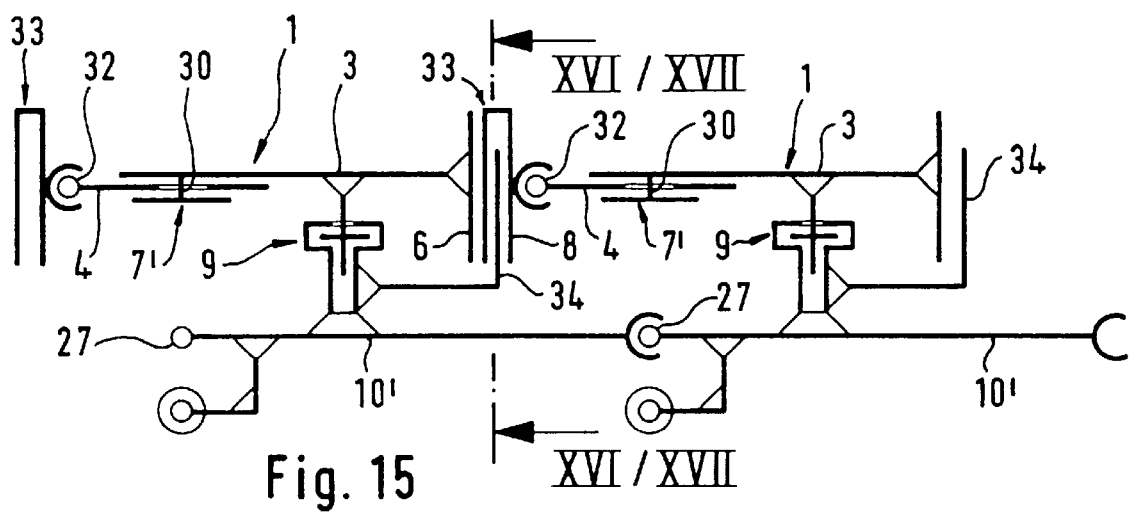
FIG. 15: a diagram corresponding to FIG. 12 for the purpose of allocating the following FIGS. 16 and 17.
Figure 16:
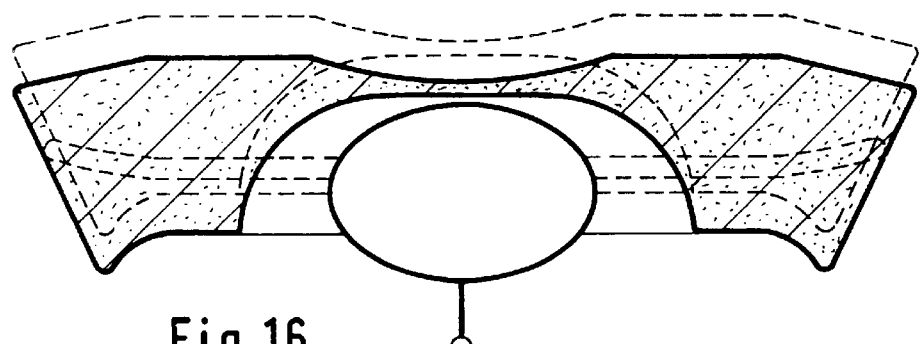
FIG. 16: a vertical section through the diagram according to FIG. 15 as seen in the direction of sectional line XVI/XVII—XVI/XVII in the area of a convex curve.
Figure 17:
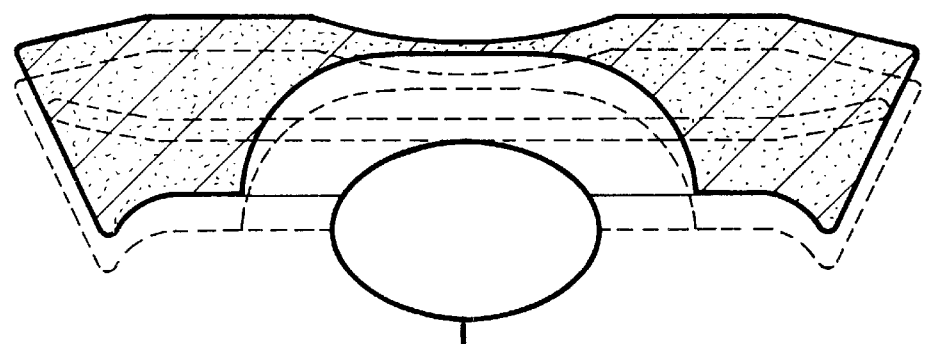
FIG. 17: a diagram corresponding to FIG. 16 in the area of a concave curve.

FIGS. 16 and 17 (details according to the diagram in FIG. 15, which in turn corresponds to FIG. 12) illustrate the deformation of the conveyor strand as seen in the longitudinal direction with a convex curve (FIG. 16) and with a concave curve (FIG. 17) along line XVI/XVII—XVI/XVII in FIG. 15.

Figure 18:
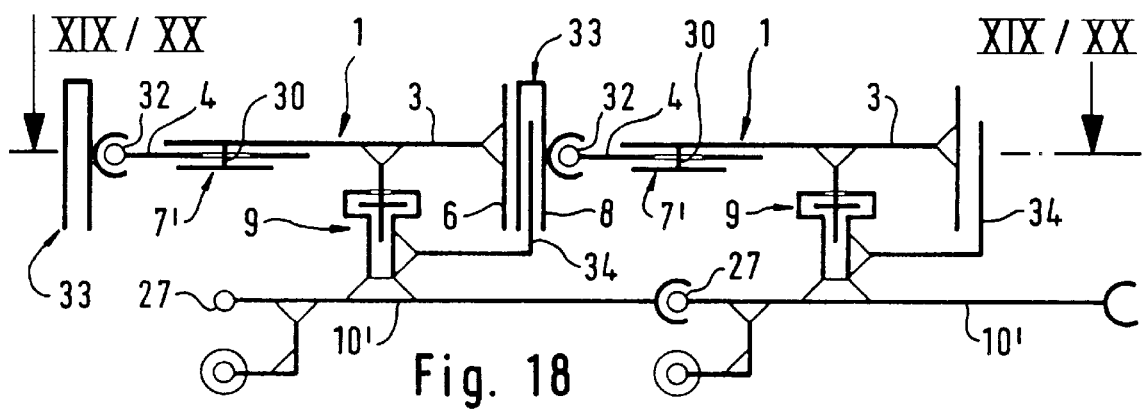
FIG. 18: a diagram corresponding to FIGS. 12 and 15 for the purpose of allocating the following FIGS. 19 and 20.
Figure 19:
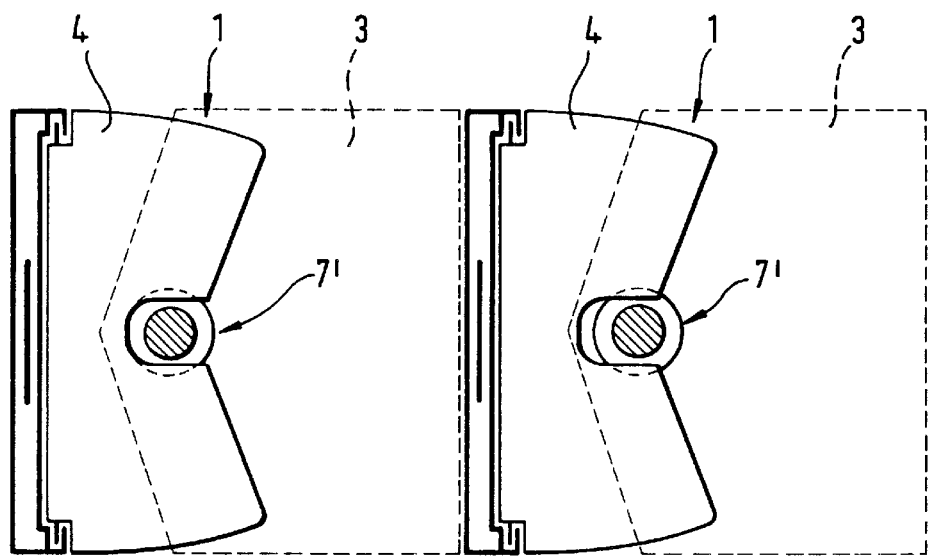
FIG. 19: a section through the diagram according to FIG. 18 as seen in the direction of sectional line XIX/XX—XIX/XX in the area of a convex curve.
Figure 20:
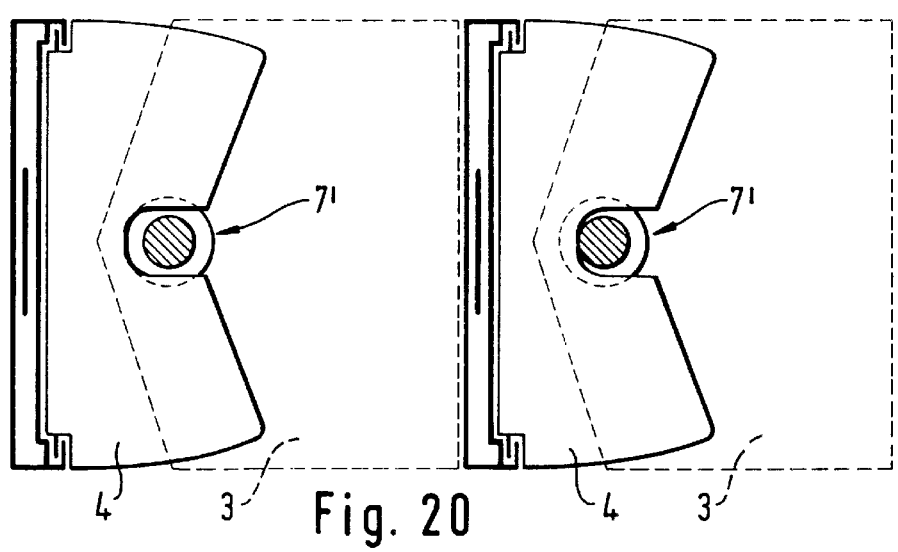
FIG. 20: a diagram corresponding to FIG. 19 in the area of a concave curve.
Figure 21:
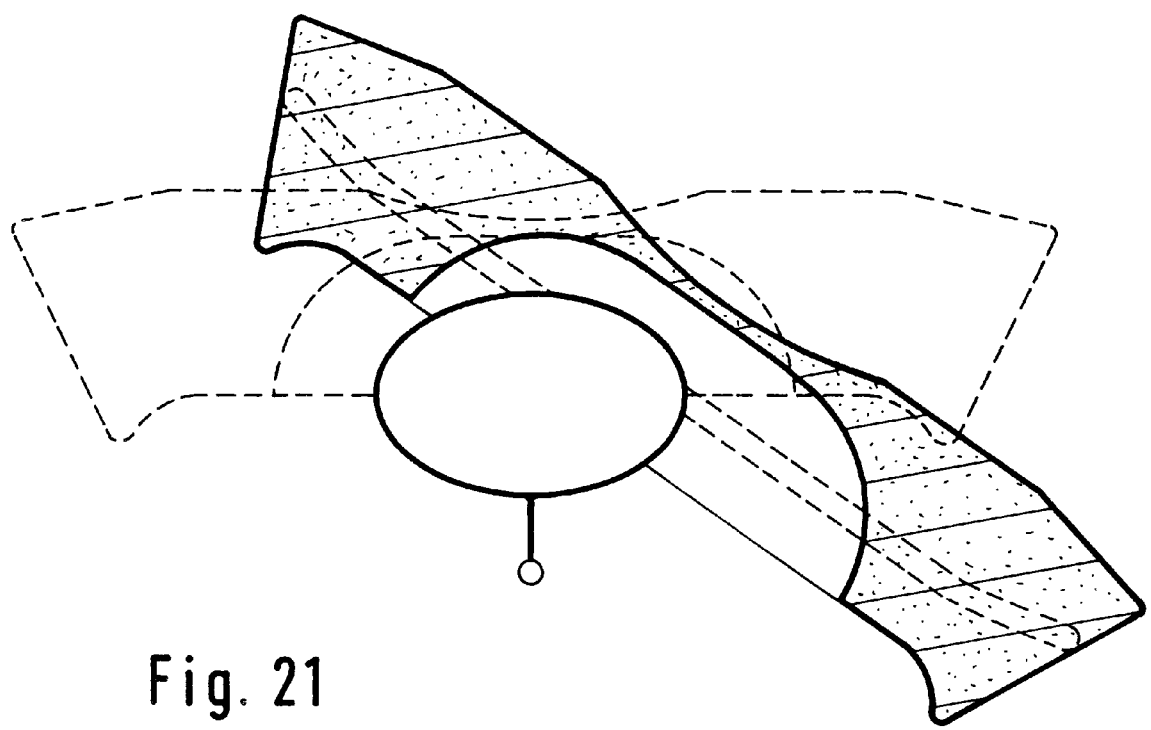
FIG. 21: a section through the diagram according to FIG. 18 as seen in the direction of sectional line XVI/XVII—XVI/XVII in tilting (toward the right in the drawing)

FIGS. 19 and 20 show in correspondence to FIG. 18, which in turn corresponds to FIGS. 12 and 15, the behavior of such a conveyor strand in a sectional top view according to line XIX/XX—XIX/XX in FIG. 18, specifically with a convex curve in FIG. 19 and with a concave curve in FIG. 20, while FIG. 21 shows a view when tilted to the right (in the plane of the drawing) in a diagrammatic sectional view which corresponds to those in FIGS. 16 and 17.

Figure 22:
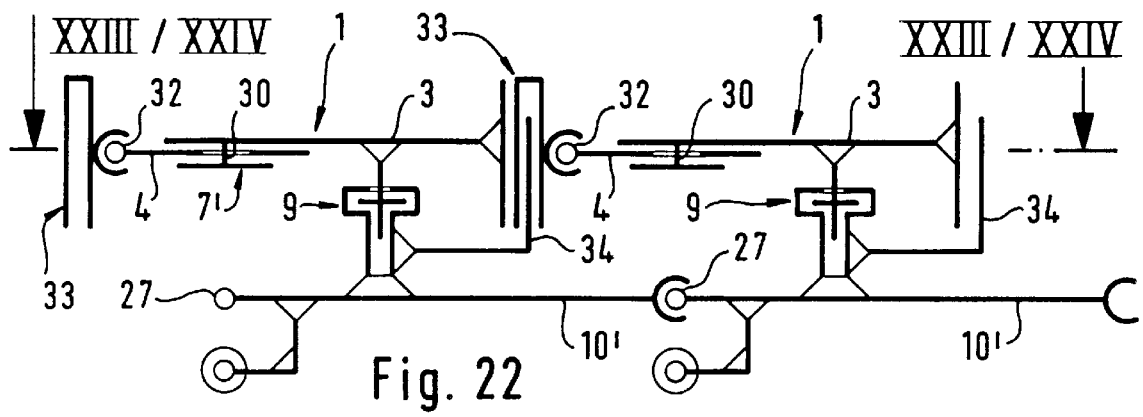
FIG. 22: a diagram corresponding to the diagrams in FIGS. 12 and 15 for the purpose of allocating the following diagrams according to FIGS. 23 and 24.
Figure 23:
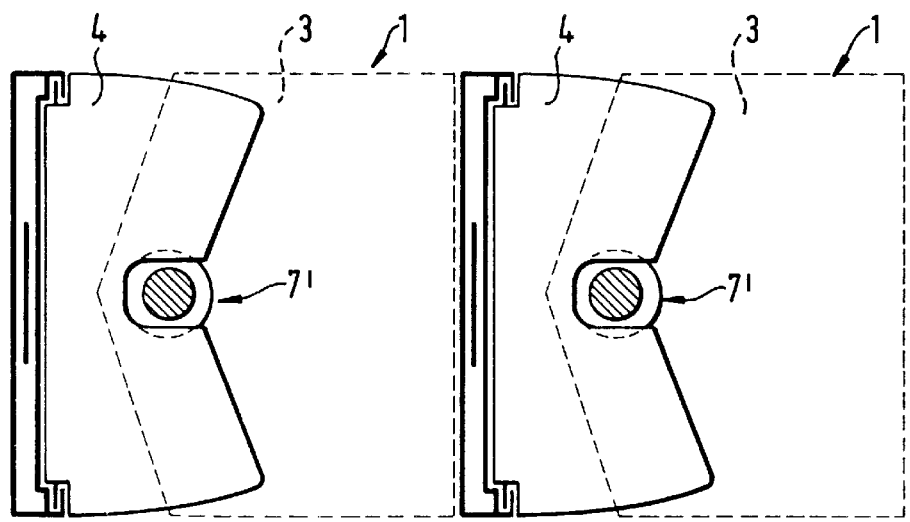
FIG. 23: a section through the diagram according to FIG. 22 as seen in the direction of sectional line XXIII/XXIV—XXIII/XXIV in the area of a straight section of conveyor line.
Figure 24:
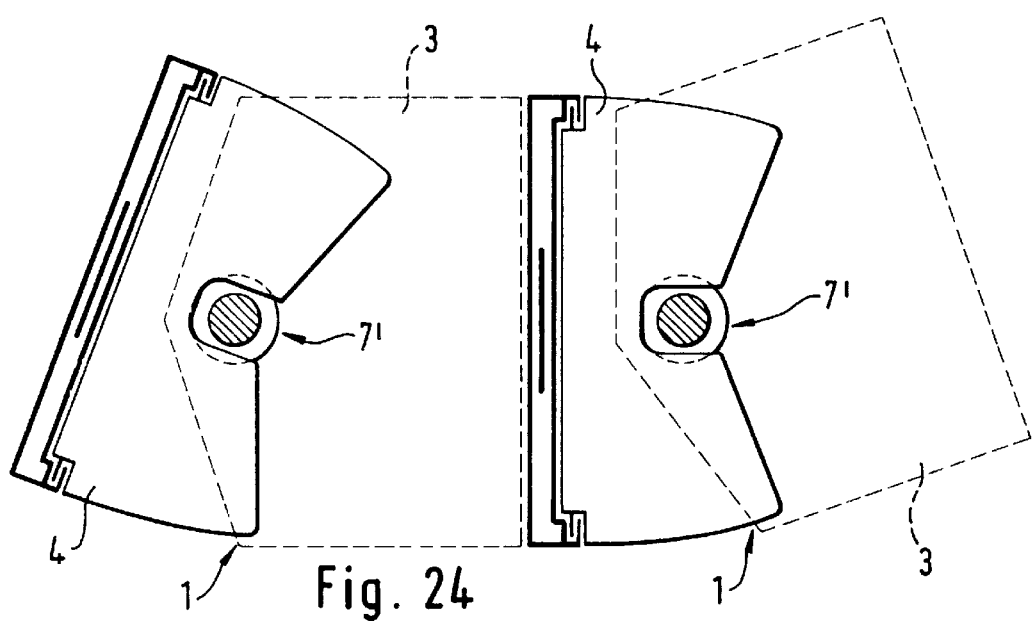
FIG. 24: a diagram corresponding to FIG. 23 in the area of a horizontal curve.

FIGS. 23 and 24, which correlate to FIG. 22, which in turn corresponds to FIGS. 12, 15 and 18, also show a sectional top view in the direction of line XXIII/XXIV—XXIII/XXIV in FIG. 22, namely on a linear conveyor section (FIG. 23) and in a horizontally curved conveyor section (FIG. 24).

Figure 25:
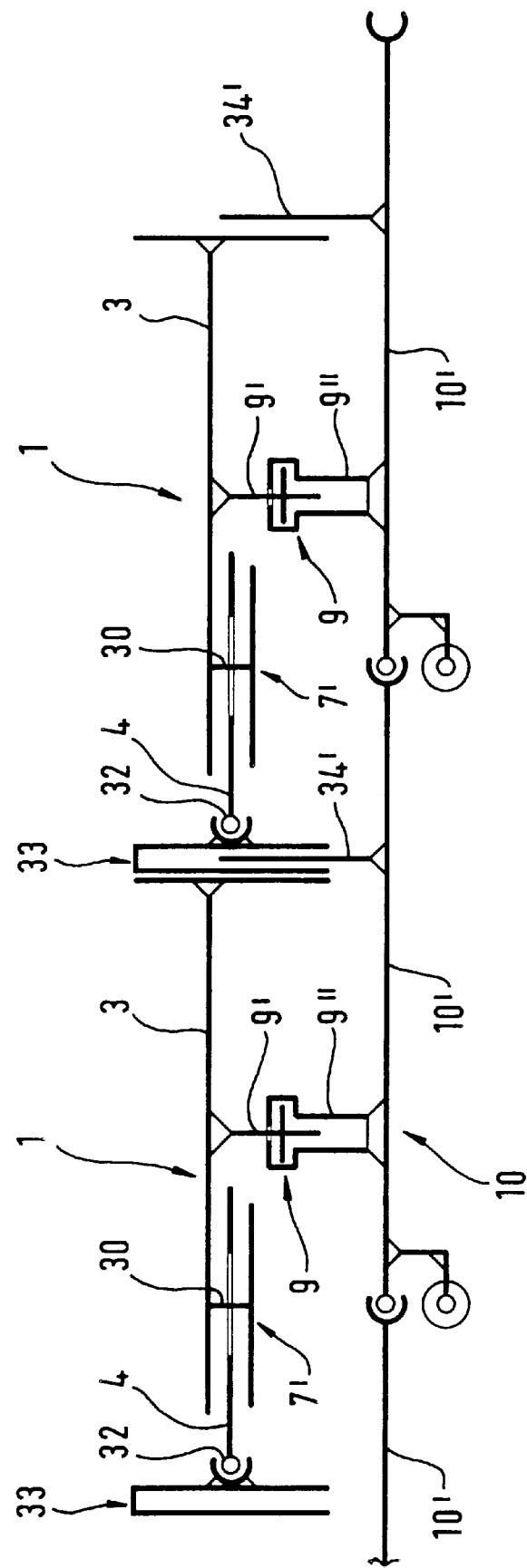
FIG. 25: another variant in a diagram corresponding to FIG. 12, with the support element for the corresponding sliding block not supported on the supporting device but instead leading directly down to chain element underneath or extending upward from there.

Finally, FIG. 25 shows a variant of a diagram corresponding to FIG. 12 (or 18 or 22); this differs from the above-mentioned designs in that support element 34', which also forms a fixed point, is not supported on supporting device 9, but instead is guided directly to a link 10' in supporting chain 10.

What is claimed is:

1. A link conveyor, specifically for conveying and sorting parcel items, having a drivable conveyor section running along a self-contained conveyor line and having a plurality of carrying plates arranged in close proximity in succession in the direction of conveyance, with the plates being supported by supporting devices on a continuous supporting chain which can be driven along the conveyor line, whereby links of the chain are pivotable about vertical and optionally also horizontal swivel axes relative to one another, where the supporting devices each have a bottom support section connected fixedly to them and projecting upward from the supporting chain, connected with a joint over a tilt axle running in the conveyance direction to a top support section projecting downward from substantially the center of the carrying plate and fixedly attached to it;

each carrying plate has a tilting mechanism connected to a top support section; the carrying plate can be tilted laterally by this tilting mechanism about the tilt axle from an essentially horizontal conveyance position into an inclined delivery position;

an end wall pointing down at a right angle from the carrying area is arranged on the front and/or rear edge running across the conveyance direction of each carrying plate, and the carrying plates each have two partially overlapping carrying plate sections, with one carrying plate section guided by a guide on the facing side of the other carrying plate section in such a way that it can move relative to the other carrying plate section in traveling through curved sections of the conveyor line, in that the other carrying plate section of a carrying plate basically has an essentially flexurally stiff plate or the like extending essentially over the entire length of the carrying plate and supported on a link of the supporting chain at a distance from the overlap area with a supporting device; and of the carrying plate, the one carrying plate section which is not connected directly to the supporting chain is coupled to another adjacent carrying plate section of the carrying plate by a sliding guide so that the two carrying plate sections can move relative to one another in a horizontally and/or vertically curved conveyor line section while maintaining an essentially self-contained, gap-free conveyor plane on uncurved sections of conveyor line.

2. The conveyor according to claim 1, wherein the carrying plate section of a carrying plate which is supported directly on the supporting chain is supported by the supporting device essentially at the center.

3. The conveyor according to claim 1 or 2, characterized in that the one carrying plate section of the carrying plate is coupled at the other adjacent carrying plate section of the carrying plate by a sliding and articulated element to the end wall of the other carrying plate section of the adjacent carrying plate.

4. The conveyor according to claim 3, wherein the swivel pin mounted on one end wall is guided in a slot in the adjacent end wall.

5. The conveyor according to claim 1, wherein two directly adjacent end walls, each made of a thin plate, are provided with a bushing pointing inward in the area of the swivel pin, with swivel pin engaged in the bushing.

6. The conveyor according to claim 1, wherein the bottom carrying plate section of a carrying plate forms a leg of an L-shaped element whose other leg forms its end wall.

7. The conveyor according to claim 1, wherein each bottom carrying plate section of a carrying plate is connected to an end wall by a joint, in particular a hinge, which forms a swivel axis across the conveyance direction.

8. The conveyor according to claim 1, wherein the top carrying plate section of each carrying plate is canted from the center toward its longitudinal edges on a cross edge which is not provided with an end wall.

9. The conveyor according to claim 1 or 2, wherein the sliding guide is arranged in the supporting device.

10. The conveyor according to claim 9, wherein the sliding guide is arranged in the top support section of the supporting device.

11. The conveyor according to claim 9 or 10, wherein the sliding guide is arranged essentially at the center of the end section of the top carrying plate section facing the bottom carrying plate section.

12. The conveyor according to claim 11, wherein the sliding guide passes through the bottom carrying plate section with an essentially perpendicular swivel pin or the like on a conveyor section that is not curved about a horizontal plane.

13. The conveyor according to claim 12, wherein a flange or the like is provided on the free lower end of the swivel pin.

14. The conveyor according to claim 13, wherein the distance between the bottom side of the top carrying plate section and the top side of the flange is approximately equal to the thickness of the bottom carrying plate section in the overlap area.

15. The conveyor according to claim 9, especially for a conveyor line which is curved vertically about a horizontal axis in at least one section, wherein the bottom carrying plate section of a carrying plate is coupled to a sliding unit designed as a sliding block or the like on its end facing away from the sliding and articulated element by a ball joint or a hinge with a horizontal swivel axis or the like, with the sliding unit being connected to and supported on the supporting chain by a support element that holds it so it can slide.

16. The conveyor according to claim 15, wherein the support element forming a fixed point is mounted on the bottom support section of the adjacent supporting device.

17. The conveyor according to claim 9, wherein the support element is attached to a link of the supporting chain.

18. The conveyor for conveying and sorting parcels in particular according to claim 1, wherein the carrying plates include essentially a casing-like hollow body made of a resistant plastic material, especially fiberglass reinforced plastic.

19. The conveyor according to claim 18, wherein the hollow cavity of the hollow body is filled with a lightweight material.

20. The conveyor according to claim 18, wherein the lightweight material is a foamed plastic.

21. The conveyor according to claim 15, wherein only the top carrying plate section is designed as a hollow body.

22. The conveyor according to claim 18, wherein essentially only the section of the carrying plate beneath the carrying area on both sides of the longitudinal center axis is designed as a hollow body.

23. The conveyor according to claim 1, wherein the carrying surface is provided with ribs, nubs or the like.

* * * * *